US008269793B2

(12) United States Patent
Elgar et al.

(10) Patent No.: US 8,269,793 B2
(45) Date of Patent: Sep. 18, 2012

(54) APPARATUS AND METHOD FOR MANIPULATING IMAGES

(75) Inventors: Adam Elgar, Garford (GB); Tom Elgar, London (GB)

(73) Assignee: Serverside Group Limited, London (GB)

( * ) Notice: Subject to any disclaimer, the term of this patent is extended or adjusted under 35 U.S.C. 154(b) by 1753 days.

(21) Appl. No.: 10/406,519

(22) Filed: Apr. 3, 2003

(65) Prior Publication Data

US 2004/0160624 A1 Aug. 19, 2004

Related U.S. Application Data

(60) Provisional application No. 60/447,972, filed on Feb. 18, 2003.

(51) Int. Cl.
*G09G 5/00* (2006.01)
*G06K 7/10* (2006.01)
*G06K 5/00* (2006.01)

(52) U.S. Cl. ... 345/629; 345/650; 345/676; 235/426.01; 235/380

(58) Field of Classification Search ............... 345/629, 345/650, 661, 679; 235/426.01
See application file for complete search history.

(56) References Cited

U.S. PATENT DOCUMENTS

| | | | |
|---|---|---|---|
| 5,410,642 | A | 4/1995 | Hakamatsuka et al. |
| 5,771,071 | A | 6/1998 | Bradley et al. |
| 5,886,334 | A | 3/1999 | D'Entremont |
| 5,889,941 | A | 3/1999 | Tushie et al. |

(Continued)

FOREIGN PATENT DOCUMENTS

DE 10055649 5/2002

(Continued)

OTHER PUBLICATIONS

Entwicklung von Rich-Internet-Anwendungen mit Macromedia MX. Macromedia White Papers Apr. 2002.

(Continued)

*Primary Examiner* — Kee M Tung
*Assistant Examiner* — Carlos Perromat
(74) *Attorney, Agent, or Firm* — McDermott Will & Emery LLP (57) ABSTRACT

An apparatus and method for manipulating images is disclosed. In one embodiment according to the invention, a method for manipulating images comprises: displaying and manipulating at a browser-based user interface a graphical representation of at least a portion of an image held at a remote image store; providing an internet communications link coupling the user interface to a remote image processor; transferring information about manipulations applied to the graphical representation between the user interface and the remote image processor; and causing the remote image processor to access the remote image store and apply, to at least a portion of the image held in the store, manipulations emulating those applied to the graphical representation. In another embodiment according to the invention, there is disclosed a method for applying a personalized image to a financial account access means corresponding to a financial account of a customer. The method comprises: associating financial data, corresponding to the financial account of the customer, with a customer image identifier in a financial account association table maintained securely from a user interface; associating the customer image identifier with user image selection data based on user selections made on the user interface in relation to a graphical representation of at least a portion of an original image held in an image store; and applying the personalized image to the financial account access means, the personalized image being based on the user image selection data associated with the customer image identifier.

14 Claims, 10 Drawing Sheets

U.S. PATENT DOCUMENTS

| | | | |
|---|---|---|---|
| 5,909,673 | A | 6/1999 | Gregory |
| 6,167,382 | A | 12/2000 | Sparks et al. |
| 6,328,209 | B1 | 12/2001 | O'Boyle |
| 6,344,853 | B1 | 2/2002 | Knight ......................... 345/435 |
| 6,493,677 | B1 | 12/2002 | Von Rosen et al. |
| 6,845,365 | B2 | 1/2005 | von Rosen |
| 6,968,335 | B2 | 11/2005 | Bayliss et al. |
| 7,016,869 | B1 | 3/2006 | Haeberli |
| 7,065,249 | B2 * | 6/2006 | Fushiki et al. ................ 382/167 |
| 7,103,230 | B1 | 9/2006 | Jam et al. |
| 7,360,692 | B2 | 4/2008 | Zellner et al. |
| 7,576,752 | B1 * | 8/2009 | Benson et al. ................ 345/619 |
| 2001/0051876 | A1 | 12/2001 | Seigel et al. |
| 2002/0025085 | A1 * | 2/2002 | Gustafson et al. ............ 382/311 |
| 2002/0057454 | A1 | 5/2002 | Ueda et al. ................... 358/1.15 |
| 2002/0059278 | A1 | 5/2002 | Bailey et al. |
| 2002/0062264 | A1 | 5/2002 | Knight |
| 2002/0067500 | A1 | 6/2002 | Yokomizo |
| 2002/0078146 | A1 | 6/2002 | Rhoads |
| 2002/0152166 | A1 | 10/2002 | Dutta et al. |
| 2002/0175931 | A1 | 11/2002 | Holtz et al. |
| 2003/0069809 | A1 | 4/2003 | von Rosen |
| 2003/0182402 | A1 * | 9/2003 | Goodman et al. ............ 709/220 |
| 2004/0093527 | A1 | 5/2004 | Pering |
| 2004/0099730 | A1 | 5/2004 | Tuchler |
| 2004/0144472 | A1 | 7/2004 | Cowie |
| 2004/0160624 | A1 | 8/2004 | Elgar et al. |
| 2004/0254833 | A1 | 12/2004 | Algiene |
| 2005/0167487 | A1 | 8/2005 | Conlon et al. |
| 2006/0200533 | A1 | 9/2006 | Holenstein et al. |
| 2007/0075134 | A1 | 4/2007 | Perlow et al. |
| 2007/0102510 | A1 | 5/2007 | Beemer et al. |
| 2007/0156837 | A1 | 7/2007 | Elgar |
| 2007/0185795 | A1 | 8/2007 | Petrime et al. |
| 2007/0215699 | A1 | 9/2007 | Arego et al. |
| 2007/0219809 | A1 | 9/2007 | Peyton |
| 2007/0267486 | A1 | 11/2007 | Ferrara |
| 2008/0230616 | A1 | 9/2008 | Elgar et al. |
| 2008/0308636 | A1 | 12/2008 | Lynch |
| 2009/0052736 | A1 | 2/2009 | Kacker |

FOREIGN PATENT DOCUMENTS

| | | | |
|---|---|---|---|
| EP | 0412520 | | 2/1991 |
| EP | 0860986 | | 10/1998 |
| EP | 0 878 956 | A1 | 11/1998 |
| EP | 1602072 | | 12/2005 |
| EP | 1847964 | | 10/2007 |
| JP | 2000190669 | | 7/2000 |
| KR | 20020033704 | * | 5/2002 |
| WO | WO 98/04988 | | 2/1998 |
| WO | 0177858 | | 10/2001 |
| WO | 0239329 | | 5/2002 |
| WO | 02067528 | | 8/2002 |
| WO | WO 03/085573 | A1 | 10/2003 |
| WO | 2004074961 | | 9/2004 |
| WO | 2005081128 | | 9/2005 |
| WO | 2006018624 | | 2/2006 |
| WO | 2006018636 | | 2/2006 |

OTHER PUBLICATIONS

EPO Examination Report, dated Aug. 31, 2006.
Perfetti, et al. Macromedia Flash: A New Hope for Web Applications. User Interface Engineering White Papers 2002, pp. 1-17.
Claessens, J., et al., "On the Security of Today's Online Electronic Banking Systems", Computers & Security, vol. 21, No. 3, pp. 257-269, 2002.
http://www.netmechanic.com/news: "Search Engine Tip: Beware of Query Strings", Dec. 199, vol. 2, No. 11, 5pp.
http://www.netmechanic.com/news: "Beginner Tip: Form Processing Basics"; Oct. 2002, vol. 5, No. 19, 7pp.
http://msdn.microsoft.com/en-us/library/ms973868(printer).aspx: "Introduction to ASP.NET and Web Forms", .NET Development (General) Technical Articles, Nov. 2001, 14 pp.
http://www.informit.com/articles/article.aspx?p=21906: "Posting HTML Form Data as XML Strings", Jun. 29, 2001; 3 pp.
http://www.peachpit.com/articles/article.aspx?p=23607: "Transforming HTML Form Data as XML Strings Using Java", Oct. 12, 2001, 3pp.
http://www.webmasterworld.com/forum47/45.htm: Microsoft IIS Web Server and ASP.NET, Jan. 25, 2002, 7 pp.
http://www.adobe.com/support/fireworks/programs/fw_to_flash/fw_to_flash05.html: "Macromedia Fireworks 4—Using Fireworks and Flash Together: Importing PNG files with transparency", 5 pp.
http://kb.adobe.com/selfservice/viewContent.do?extemalld=tn_12804: "TechNote: Transparency Support in Flash", 4 pp.
http://www.ncftp.com/libncftp/doc/ftp_overview.html: "An Overview of the File Transfer Protocol", 8 pp.
Vuong, A., "Home PC surfers accelerate use of high-speed connections", The Denver Post, Feb. 9, 2001, 3 pp.
http://compnetworking.about.com/od/basicnetworkingconcepts/1/aa021403a.htm: "Internet Time: History of Computer Networking 1998-2003", 2 pp.
http://www.comscore.com/press/release.asp?id=249: "Global Napster Usage Plummets, but New File-Sharing Alternatives Gaining Ground, Reports Jupiter Media Metrix"; Jul. 20, 2001, 5 pp.
Reply Evidence under Rule 59 of the Patents Rules, 2003 in Opposition filed by Dimpledough. Inc. against Indian Patent No. 230390; Executed Affidavit of Dr. Belovich dated Mar. 23, 2010.
Reply Evidence under Rule 59 of the Patents Rules, 2003 in Opposition filed by Dimpledough. Inc. against Indian Patent No. 230390; Executed Affidavit of Dr. Belovich dated Jul. 26, 2010.
Reply Evidence under Rule 59 of the Patents Rules, 2003 in Opposition filed by Dimpledough, Inc. against Indian Patent No. 230390; Affidavit of Tom Elger dated Aug. 31, 2010.
Reply Evidence under Rule 59 of the Patents Rules, 2003 in Opposition filed by Dimpledough, Inc. against Indian Patent No. 230390; Executed Affidavit of Tom Elger dated May 9, 2010.

* cited by examiner

APPARATUS AND METHOD FOR MANIPULATING IMAGES

CROSS-REFERENCE TO RELATED APPLICATION

This application claims the benefit of U.S. Provisional Application Ser. No. 60/447,972 of Elgar et al., filed Feb. 18, 2003, entitled "Method and Apparatus for Manipulating Images," the disclosure of which is hereby incorporated herein by reference.

TECHNICAL FIELD

This invention relates to methods and apparatus for manipulating images; and in particular to methods and apparatus for reproducing personalized images on consumer goods at locations remote from a user. The preferred embodiment includes on-line product-based image manipulation software.

BACKGROUND

There has been an increasing consumer desire for self-differentiation, particularly for differentiating mass-marketed personal items. This can be clearly seen in the recent popularity of customized mobile phone ring-tones and fascias. In order to provide customized graphics on personalized products, there has therefore been a need for a quick and easy-to-use graphics manipulation suite to allow users to make product-specific designs, particularly from locations remote from the main image storage and printing facility. However, providing such a graphics manipulation suite over the Internet has not proved easy.

One problem stems from the open nature of the Internet itself. In order to allow Internet users to visit hundreds of thousands of unverified web sites, and yet still protect the user's computer from viruses and malicious hackers, a browser must not allow the web sites to access files on the user's computer. Thus, browsers are "dummy terminals," albeit very powerful ones; it is not possible to actively "do" anything with an Internet browser—it simply navigates between online resources and presents information and images to the user. Thus, for designing a graphical image for application to a personal item, an internet user may be able to manipulate images within the browser environment, but will not be able to save the images.

The problem of manipulating images has previously been solved in two ways, each of which has disadvantages. In one solution, a user manipulates images on his or her own machine without the use of a browser. This solution has the advantage of being extremely fast once installed on the local machine, but suffers from three major failings. First, in order to allow the program to run on the client machine, the user must first download a program. This takes time, and is inconvenient, because the software cannot be seen or tested until it is fully downloaded. Next, the program must be installed on the user's machine, where it will remain permanently until removed. This clogs up the client hard drive, slows down the user's computer, and can (if the software is not very good) cause system crashes. Finally, the program may have computer viruses.

In another image manipulation solution, an image is manipulated on a server using Java Applets. The theoretical advantages of Java are that it can run on any client machine with identical results; and that the software does not need to be installed on the client machine, because the Java Applet runs within a Java Virtual Machine within the browser. The problem with Java is that the Internet simply is not fast enough to provide a pleasant user experience. Each time the user uses the interface to manipulate the image, a call is made to the server. The server software changes the image's position, and sends back the information to the client machine. Also, in practice, because the Java Applet does not know which type of machine it will be run on, it can react very differently from one machine to the next.

SUMMARY

Embodiments of the present invention seek to provide an improved method and apparatus for manipulating images.

According to an aspect of the present invention there is provided a computer system for manipulation of remote images.

In a preferred embodiment the graphical user interface comprises a user computer equipped with an internet browser. The communications means may comprise the internet. The remote image processor and/or image store may be in a secure computing environment coupled to the internet.

According to another aspect of the present invention there is provided a method of operating a computer system for manipulating remote images.

According to another aspect of the present invention there is provided a computer program product comprising program code means for manipulating remote images. The program code means may be stored on a carrier.

According to another aspect of the present invention there is provided a computer system for manipulation of remote images, the computer system comprising: a browser-based user interface for displaying for manipulation a graphical representation of at least a portion of an image held at a remote image store; an internet communications link coupling the user interface to a remote image processor, said link being operable to transfer information about manipulations applied to the graphical representation between the user interface and the remote image processor; and means for the remote image processor to access the remote image store in order to apply to the image held in the store manipulations emulating those applied to the graphical representation. The image held at the remote image store may be of a relatively higher resolution than the graphical representation of at least a portion of the image. The remote image processor may further comprise means for communicating a version of the image, comprising the applied manipulations, to an image printing means maintained securely from the user interface.

According to another aspect of the present invention there is provided a method of operating a computer system for manipulation of remote images, the method comprising: displaying and manipulating at a browser-based user interface a graphical representation of at least a portion of an image held at a remote image store; providing an internet communications link coupling the user interface to a remote image processor; transferring information about manipulations applied to the graphical representation between the user interface and the remote image processor; and causing the remote image processor to access the remote image store and to apply, to at least a portion of the image held in the store, manipulations emulating those applied to the graphical representation.

According to another aspect of the present invention there is provided a computer program product comprising program code means, said program code means including: first code for displaying and manipulating at a browser-based user interface one or more graphical representations of at least a portion of an image held at a remote image store; second code means for establishing an internet communications link coupling the user interface to a remote image processor; third code means for transferring information about manipulations applied to the graphical representation between the user interface and the remote image processor; and fourth code means for causing the remote image processor to access the remote image store and to apply to at least a portion of the image held in the store manipulations emulating those applied to the graphical representation.

In another embodiment according to the invention, there is provided a computer system for manipulation of remote images, the computer system comprising: a front end server system for operating computer program means for providing a user interface for displaying a graphical representation of at least a portion of an image held at a remote image store for user selection from amongst a plurality of similar such graphical representations of at least a portion of each of a plurality of images held at the remote image store; and an internet communications link coupling the front end server system to a remote image processor capable of accessing the remote image store in order to select the original image held in the store, from amongst the plurality of similar such images held in the store, in a corresponding fashion to the user selection made on the user interface. In a further related embodiment, the computer program means further comprises means for enabling user manipulation of the graphical representation on the user interface; and the remote image processor comprises means for accessing the remote image store in order to apply to the image held in the store manipulations emulating the user manipulations of the graphical representation on the user interface.

In another aspect of the invention, there is provided a system and method for applying a personalized image to a financial account access means corresponding to a financial account of a customer. In one embodiment, a system for applying a personalized image to a financial account access means corresponding to a financial account of a customer comprises: a financial account association table associating financial data, corresponding to the financial account of the customer, with a customer image identifier; an image manipulation emulator for associating the customer image identifier with user image selection data based on user selections made on a user interface in relation to a graphical representation of at least a portion of an original image held in an image store; and an image application means for applying the personalized image to the financial account access means, the personalized image being based on the user image selection data associated with the customer image identifier by the image manipulation emulator; wherein the system maintains at least the financial account association table securely from the user interface. The system typically further comprises: a front end server for presenting the user interface; and a back end server, comprising the image manipulation emulator, for communicating with the front end server and with the image store. The front end server may further comprise means for communicating a user manipulation data string to the back end server. The financial account access means may comprise a credit card, debit card, or other transaction card means. The graphical representation of the original image may comprise a re-sized version of the original image. The original image may be uploaded from the customer's own computer. The user selections may comprise operations selected from rotating, re-sizing, and positioning the original image. The user image selection data may further comprise data relating to at least one image, which may comprise a transparent frame image, for overlaying onto the original image. Furthermore, the user selections may comprise operations for positioning at least a portion of the original image within a window region of the financial account access means. The window region may exclude regions of the financial account access means that display functional features of the financial account access means. For example, the financial account access means may comprise a credit card, debit card, or other transaction card means; and the functional features of the financial account access means may comprise a bank logo, a transaction card hologram, or a transaction card type indicator.

In another embodiment, a method for applying a personalized image to a financial account access means corresponding to a financial account of a customer comprises: associating financial data, corresponding to the financial account of the customer, with a customer image identifier in a financial account association table maintained securely from a user interface; associating the customer image identifier with user image selection data based on user selections made on the user interface in relation to a graphical representation of at least a portion of an original image held in an image store; and applying the personalized image to the financial account access means, the personalized image being based on the user image selection data associated with the customer image identifier. The method may further comprise presenting the user interface using a front end server; and using a back end server, in communication with the front end server and the image store, to re-create the user selections made on the user interface. The method may also comprise communicating a user manipulation data string from the front end server to the back end server. The financial account access means may comprise a credit card, debit card, or other transaction card means; and the graphical representation of the original image may comprise a re-sized version of the original image. The method may further comprise uploading the original image from the customer's own computer. The user selections may comprise operations selected from rotating, re-sizing, and positioning the original image. The user image selection data may further comprise data relating to at least one image, which may comprise a transparent frame image, for overlaying onto the original image. Furthermore, the user selections may comprise operations for positioning at least a portion of the original image within a window region of the financial account access means. The window region may exclude regions of the financial account access means that display functional features of the financial account access means. For example, the financial account access means may comprise a credit card, debit card, or other transaction card means; and the functional features of the financial account access means may comprise a bank logo, a transaction card hologram, or a transaction card type indicator.

BRIEF DESCRIPTION OF THE DRAWINGS

For a better understanding of the present invention, and to show how the same may be carried into effect, reference will now be made, by way of example only, to the accompanying drawings, in which.

DETAILED DESCRIPTION

An embodiment according to the invention allows a user to manipulate an image through a browser interface, and is divided into two software portions, here referred to as front end software and back end software.

The front end software operates entirely within an Internet browser and does not require a download, because it accepts the limitations of the browser. In one embodiment, the front end software runs Flash software, available from Macromedia Inc. of 600 Townsend Street, San Francisco, Calif. 94103, U.S.A., or equivalent software. The front end software is a pure Graphical User Interface (GUI), and allows a user to design and edit graphics on his or her screen in order to build a representation of a desired image. Representations of stock (starting) images can be presented to a user in an on-screen image library and/or created by the user on demand. The image desired for output can be made up from one or several representative components, each of which has its position defined relative to an origin, and can be manipulated based on a set of predetermined rules—such as, for example, rules allowing the image or its components to be resized, rotated, flipped, mirrored and moved relative to other components. The representative graphical components can be used, for example, to build relatively complex designs consisting of a plurality of different layers and/or transparencies constructed using Flash scenes.

When the design is completed, in an embodiment according to the invention, instructions about what the final image looks like are sent to the back end software, which runs on a server. In the preferred embodiment, these instructions take the form of a text string for each component of the image. For example, the text string file makeimage.aspx for a graphics component might read:

$id\text{+=}030, x\text{=}182, y\text{=}32.3, \text{flip=yes}, \text{rotate=}270, \text{scale=}190.6, \text{user=}230$ where id is an image identifier; x and y define the position of a component relative to a predetermined origin; flip, rotate, and scale define manipulations of types generally well known in the art; and user is a number identifying the user. Those of skill in the art will appreciate that a range of image manipulations can be defined in this way. A resulting image may be represented by one or a number of graphical components. It is thus possible for a plurality of text files, or an extended text file, to define an image made of a plurality of separate graphical components. The graphical components used, for example, in Flash movie scenes are generated and manipulated with a minimum of computing resources; and the designs constructed as a result can be recreated on the back end (server) side using the relevant (and generally much larger) image files.

It is the back end software that actually makes the final image, in accordance with an embodiment of the invention, by interpreting the manipulations applied to the representation (defined in the, or each, text string file) and applying corresponding manipulations to one or more stock images held in a remote image store. The images used in the front end software are less computationally-demanding representations of those held on the server. As a result, the back end software can make image transformations that exactly mirror those which are seen on the client machine. Once the desired image has been created by the back end software, the image can be output to whatever device is required, such as a device for printing the image onto a personalized consumer item. In this way, the graphical representation is displayed and manipulated at the user interface by means of the Flash software, and only a minimal amount of information concerning the image and manipulations applied thereto need be transferred to the remote image processor.

As mentioned above, the front end software may use Macromedia's Flash, or another product. Use of Flash (or equivalent) software is advantageous in that it does not allow full access to a user's local files, so that it does not risk transmitting computer viruses to the user's machine. Use of Flash software also does not require a user to install software other than the Flash plug-in, which has a high penetration of the browser market.

The preferred embodiment thus allows for on-line image manipulation by emulating the browser-based transformations (such as re-sizing or overlaying images), made by the user on a representation of the image, on the server so that the images produced can be used for personalised product creation.

On-line image manipulation is allowed by creating a two-tier architecture, in an embodiment according to the invention: there is one program that allows image manipulation on the screen in front of a user; and a second program on a server that emulates these manipulations, so that the images can be output for personalised product creation. In the preferred embodiment, the back end process, or elements of it, are performed in a secure computing environment. In this way, a user with internet access can design customised images for printing on a remote product which requires secure treatment. For example, anti-fraud and anti-theft measures mean that the production of credit cards, and other types of transaction cards, is performed in secure locations. Customisation of the designs applied to such cards is thus possible, using preferred embodiments, without the need to give the user direct computing access to the secure environment.

An online image-editing tool uses the browser environment of HTML and Macromedia Flash as a Graphical User Interface for remote software that emulates the actions taken on the client machine, in an embodiment according to the invention. This enables a fast experience for the user and a high quality end product. However, the browser-based, client-side environment allowing manipulation by the user need not necessarily be Flash from Macromedia. Any equivalent software tool capable of providing the required functionality could be used—for example, any tool capable of generating a representation of an image, applying manipulations thereto, and saving the results through a set of commands to the server-side software, such that an image processor on the server side can emulate the actions of the front end and create a result image that can be saved to the server. The front end software will allow the upload of images from the user's computer to the server, so that the user's own images can be manipulated and overlaid with "stock" images and borders. Then a company, by communicating with the back end software, can produce personalized goods for a user. Such personalized goods may include, for example, credit cards, debit cards, mobile phone covers, mugs, T-shirts, gift cards, and framed prints.

An embodiment according to the invention has the advantage that high quality images do not need to be uploaded to the customer's browser, because lightweight, web-enabled formats may be used for the user's experience, thereby making the system fast and easy to use. However, when the information is downloaded, the original high quality image can be used to give high quality print results. An embodiment according to the invention also allows companies to provide light-weight but fast graphics manipulation for their clients, without the complication of downloading programs. Additionally, a user interface according to the invention is not constantly calling to the server; thus the interface is quick and pleasant to use, and Internet bandwidth requirements are reduced. As another advantage of an embodiment of the invention, the original image is not transferred over the internet at the manipulation stage, so that the possibilities for hacking the image are greatly reduced. Also, because the interface runs within the Macromedia Flash environment, the interface is platform independent. Finally, because the final image may be created on a server controlled by a single company, the final image output may be made to have a standardized size and resolution. This enables easy integration with printers, simplifies the production of a personalized product, and simplifies billing on a per-image basis.

Figure 1:
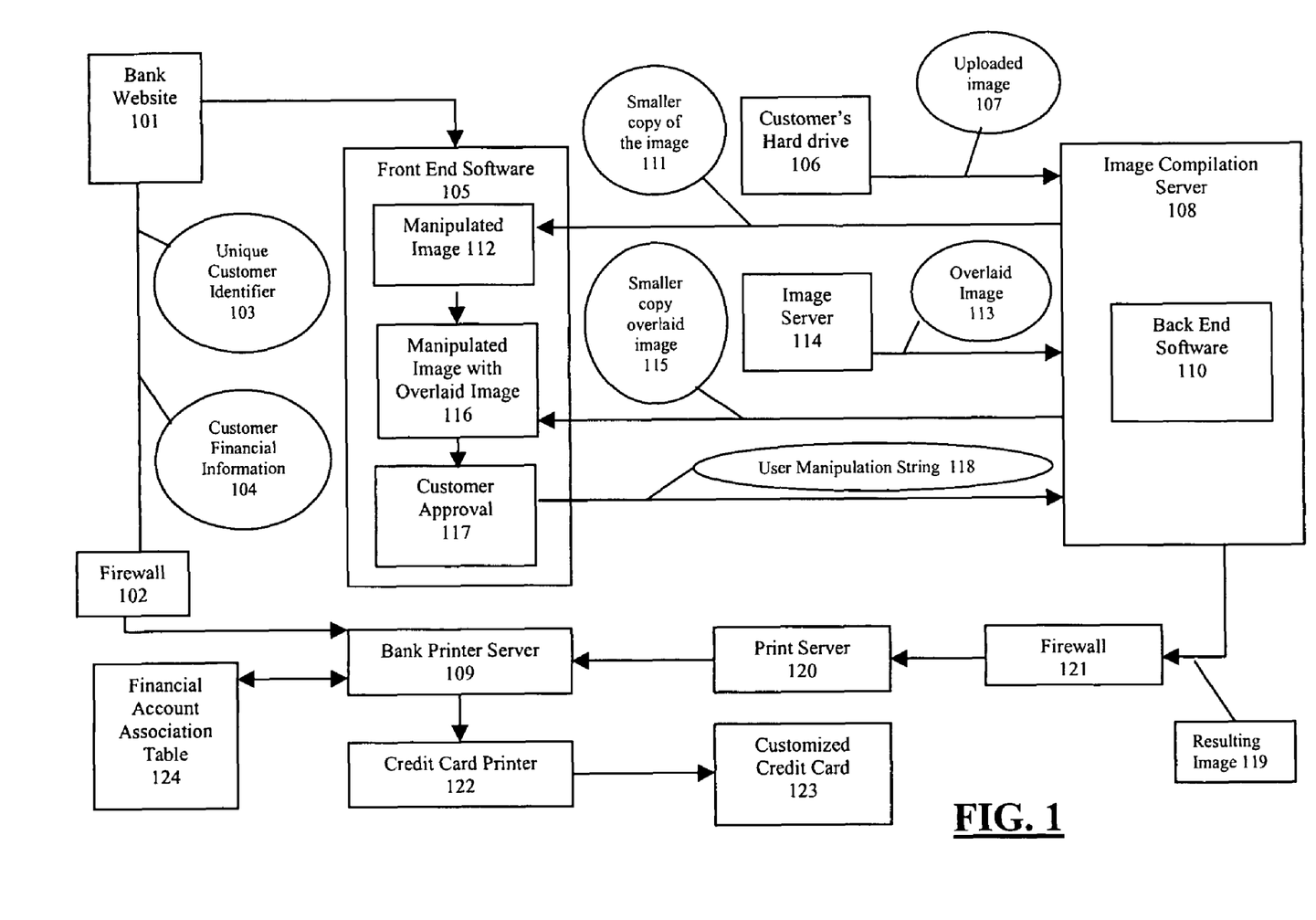
FIG. 1 illustrates a computer system for remote manipulation of images, in accordance with an embodiment of the present invention.
Figure 2:
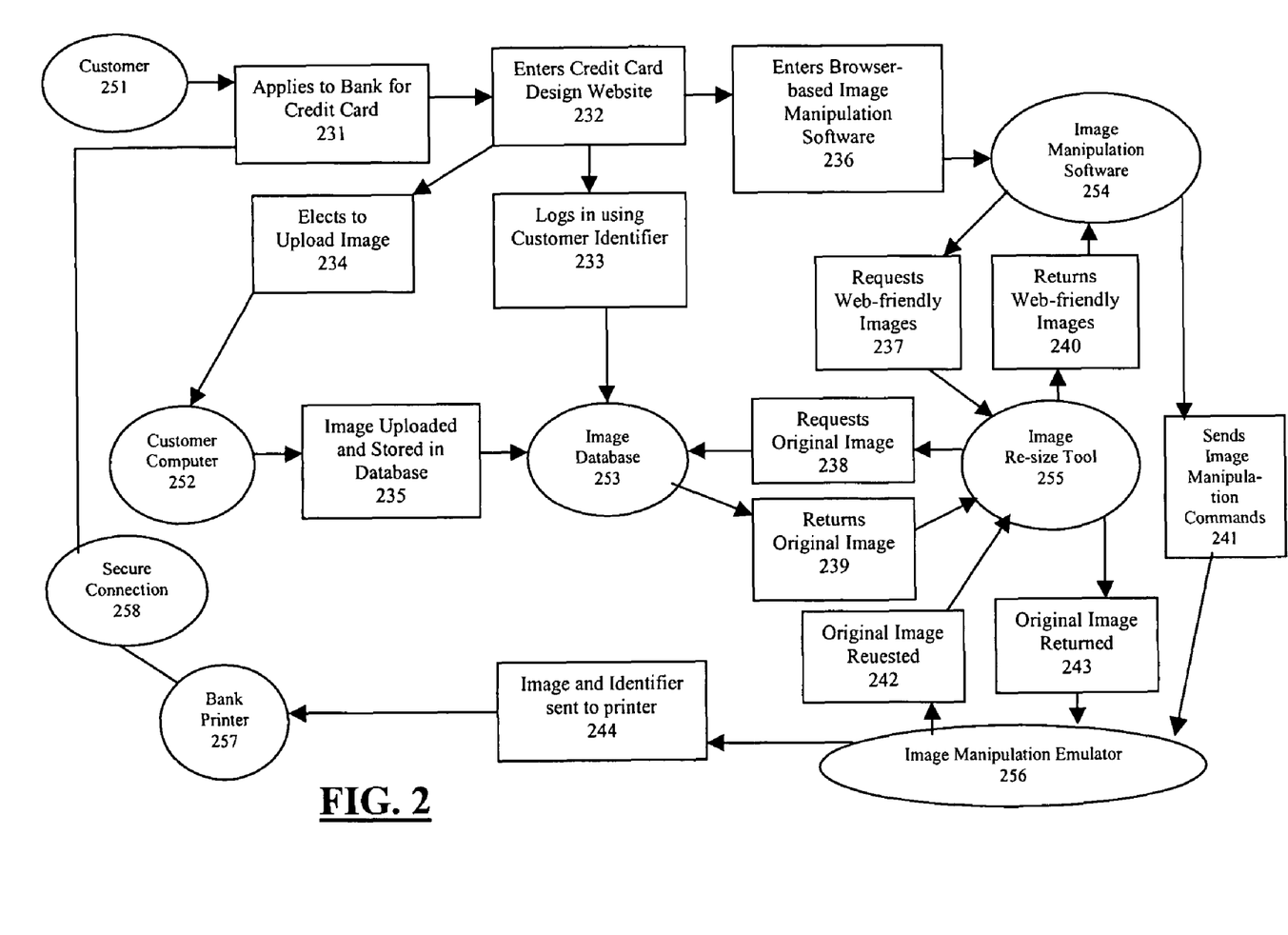
FIG. 2 illustrates a method of operating a computer system for remote manipulation of images, in accordance with an embodiment of the present invention.

By way of example, FIGS. 1 and 2 describe the production of a credit card, in accordance with an embodiment of the invention.

In the embodiment of FIG. 1, a customer accesses software according to the invention, after having applied for a credit card through a bank web site 101. In the first step, the bank issues the customer with a unique identifying number 103 which is parsed to an image compilation server 108, which may be operated by a company other than the bank. The bank associates the unique customer identifier 103 with the customer's financial information 104. This association may be performed in a financial account association table 124 maintained in an environment that is secure from the user interface. The associated customer identifier 103 and financial information 104 are passed to a bank printer server 109 via a firewall 102. Next, the customer enters the front end software 105, which may be operated by a website server or other front end server. The customer chooses an image 107—in FIG. 1, from the customer's computer hard drive 106—and uploads it to the image compilation server 108. The image 107 could also come from an image library maintained by an operator of the image compilation server 108. Back end software 110, running on the image compilation server 108, now enters the original image into a database and generates a web-friendly smaller copy 111 to send to the front end software 105. The customer now performs image manipulations 112 (such as resizing, rotating, and placing the image), as the customer desires. The back end software 110 associates the customer image selection, and subsequent manipulations and selections, with the unique customer identifier 103. Next, the customer chooses another image 113 to overlay on top of the first image 107, and positions image 113 as desired. The overlaid image 113 may, for example, be a transparent decorative frame for the uploaded image 107, and may be maintained in an image server 114. The back end software 110 transmits a web-friendly, smaller version 115 of the overlaid image 113 to the customer, for use in a creating a combination 116 of the original manipulated image 107 with the overlaid image 113. Once customer approval 117 of the final design 116 is received, the front end software 105 transmits a string of user manipulation data 118 to the image compilation server 108. This string 118 encapsulates the customer's image selections and manipulations. On receiving this string 118 the back end software 110 accesses the original copies of the images from an image library and performs the exact operations that the customer has chosen in the front end software 105 for the customer's final design. At this point the back end software 110 can output the resulting image 119 to a printer server 120, which may be performed through a firewall 121. The resulting image 119 and associated customer identifier 103 may then be passed to the bank printer server 109, which in turn accesses the financial account association table 124 to obtain the associated secure customer financial information 104. The financial information 104 and resulting image 119 may then be sent to a credit card printer 122, which prints a customized credit card 123. All of the images that are used by the customer in the front end software 105 are issued via the back end software 110. The only information which passes to the back end software 110 from the front end software 105 (apart for requests for images) is data about how the image in front of the customer appears. This information can easily be encrypted for increased security. The number of images combined in a design is not limited to two (such as images 107 and 113)—the script can be easily amended for many more layers. Also, transparent frame image layers need not be selected and manipulated before a non-transparent image layer; the image layers can be designed in any order. Text can also be added to the image through a similar replication. The output image can be sent to any type of machine and thus the possible applications are very wide-ranging: the software can be applied not only to the payment card market, but also for non-payment and telephone cards. In one embodiment, the final image displayed on a card may be restricted to a selected "window" on a payment card (or other financial account access means), leaving the rest of the card free to contain functional features of the card, such as a bank logo, a payment card hologram or type indicator (such as, for example, "Visa" or "MasterCard" logos). Alternatively, some image layers may be positioned within such a selected window on the card; while other image layers (such as transparencies) are positioned outside the selected window, but surrounding the functional features of the card (such as the bank logo, payment card hologram, etc.).

In the embodiment of FIG. 2, in a first step 231, a customer 251 has applied to a bank online for a credit card, or is an existing customer offered the opportunity to make a new card for an existing account. In step 232, the customer clicks a link redirecting the user to a website (which may be operated by a company other than the bank) for designing the credit card—arriving with a unique identifier which relates to the customer's account and which will be carried with the customer throughout the customer's time on the site. In step 233, the customer identifier is used to log-in; alternatively, the customer could log-in separately at this point and recollect the customer's identifier. Since the design website uses only the customer identifier to identify the customer, it does not obtain any of the customer's financial details. In step 234, the customer elects to upload an image from the customer's own computer 252, such as a scanned or photographed image. In step 235, the image is uploaded to an image server, and may be held in a database 253 for convenience. In step 236, the customer enters browser-based image manipulation software 254. In step 237, the image manipulation software requests a series of images in web-friendly formats from an image re-size tool 255, so that the process is fast and quick to use. In step 238, the image re-sizing tool requests the original image from the database 253; in step 239, the original image is returned and re-sized to a web-friendly format and size; and in step 240, a set of web-friendly images is returned to the image manipulation software 254. Once the customer has achieved the desired effect by scaling, flipping, or rotating the series of images required, the associated image manipulation commands are sent 241 to an image manipulation emulator 256. In step 242, the image manipulation emulator 256 then requests the original images from the image server so that the best quality image is used. Upon receiving the images in step 243, the emulator 256 then repeats the completed transformations of the customer and creates an image identical to the one created online, but using the original, higher quality graphics. In step 244, this image, and the associated customer identifier, is sent to the bank's printer 257. The financial data corresponding to the customer identifier is obtained, via a secure connection 258 to the bank; and the printing process set in motion.

In an embodiment according to the invention that places personalized images onto plastic, credit card-style cards, it is necessary to ensure a very high level of security. Therefore, in circumstances where there are already financial records in place for the user, the architecture receives a unique non-sequential customer identifier, which matches with a set of financial records, from the credit card issuer. This customer identifier is passed through each element of the system and is returned with the generated image file. Thus in a "mail merge"-type operation, the customer's personalized image can be matched up with the customer's financial and personal records, so that the correct image is placed on the card. At no time does either the front end or back end software have any financial information. The customer identifier may be used in an automated log-in process. In this way, the software (both the front end and back end software) can know whether the user is new or not. A returning visitor can thus be presented with images that were uploaded on a previous visit.

The system's architecture comprises two distinct elements, in an embodiment according to the invention. The front end element, the element that the user interacts with, is built in Macromedia Flash. This element allows the user to design a card by manipulating (through scaling, rotating etc) the image uploaded and then overlaying the image with frames that can contain transparent sections. Since Flash does not have "local permissions" on the client machine, as it is a browser-based interface, it is not capable of saving the final design. It therefore sends a string of instructions to the second, serverside element. The second, serverside element may be written in C#, although Java, C, C++ etc. would be equally capable. The string of instructions may be sent as a "querystring," i.e. as part of the URL; for example, the string could be formatted as:

(createpage.aspx?here_are_the_string_of
    instructions&rotate=90&flip=yes . . . )

Other methods may also be used for transmitting the user's design manipulations, such as using an HTML style "form," or writing the information to a Cookie and then re-reading the information.

The customer identifier may be passed using Session State (the webserver's Session Object) or by passing as part of the "querystring," in accordance with an embodiment of the invention. HTML "forms" could achieve the same ends.

In accordance with an embodiment of the invention, an image can be uploaded as a JPEG, GIF, BitMap, PNG, Tiff etc.; although it will be appreciated that nearly any pixelated digital image can be uploaded or output. From the original uploaded image the system creates four separate versions:

1. A thumbnail version (as a JPEG)—see the interface screenshots, below. The image is approximately 1 to 2 k in file size.
2. A larger, but still web-optimized version (this is scaled to allow the image to be expanded to the maximum available by the interface—such as scaling 250%—and still have one-to-one pixel matching (i.e. the image size is width 241×250% if possible). This is the image used on screen for the design of the card.
3. A Bitmap image at the same scale as the original image. A Bitmap image may be used, for example, in a system that uses C#, which is a Microsoft language and uses Bitmap as the default image type.
4. The output design, which may be sized in proportion to a credit card. This design could be of any software format that is useful to the printer used, such as BMP (Bitmap) or PNG (Portable Network Graphic).

The original images may be placed into a database once they have been uploaded. In one embodiment, each request for images requires going back to the original version to use; however, this need not be the case, because once another image version has been created (e.g. a thumbnail version), the system can equally store this version so that the processing is reduced (though memory taken would increase). A key benefit of an embodiment according to the invention is that it is not necessary to pass the largest image backwards and forwards across the web from client to server, except for the initial upload of images. Nonetheless, when the final image is generated, the highest quality image is used.

In an embodiment according to the invention, the user designs, on screen, an image that appears the same physical size as a credit card using the screen resolution of 72 dpi. This is because a computer monitor cannot present images at a higher resolution than this. However, a printer can output at higher resolutions, typically 300 dpi—greatly increasing the quality to Although the front end software uses the low resolution images, the final design is compiled by the back end software using a full scale, bitmap version of the original image uploaded. This may be achieved by using a "virtual canvas" within the back end software that is larger than the design canvas within the front end software. Thus the design being created by the back end software is laid on to a background of greater size than in the front end software (while maintaining 72 dpi resolution). Thus, if the credit card size in pixels is 241 by 153 then, by laying the image on a "virtual canvas" credit card of, 482 by 306 at 72 dpi, the resolution can be increased to 300 dpi when the credit card is finally printed (back at 241 by 153). This method ensures that the maximum dpi achievable (to the printer's maximum setting) is output from the back end software, but only the resolution necessary is sent to the front end software. This reduces the memory requirements of the client machine and the Internet traffic. This operation could equally be achieved by changing the resolution of a 72 dpi image to 300 at the original size.

In order to use transparencies, in an embodiment according to the invention, the images containing a transparent layer (usually frames or borders) must be converted into Flash "movies" themselves. This process can be manual, but can also be automated to allow images with transparencies (such as bitmaps or PNG) to be imported into the front end software "on the fly." The back end software can use the original PNG or BMP image to generate the credit card image.

Figure 3:
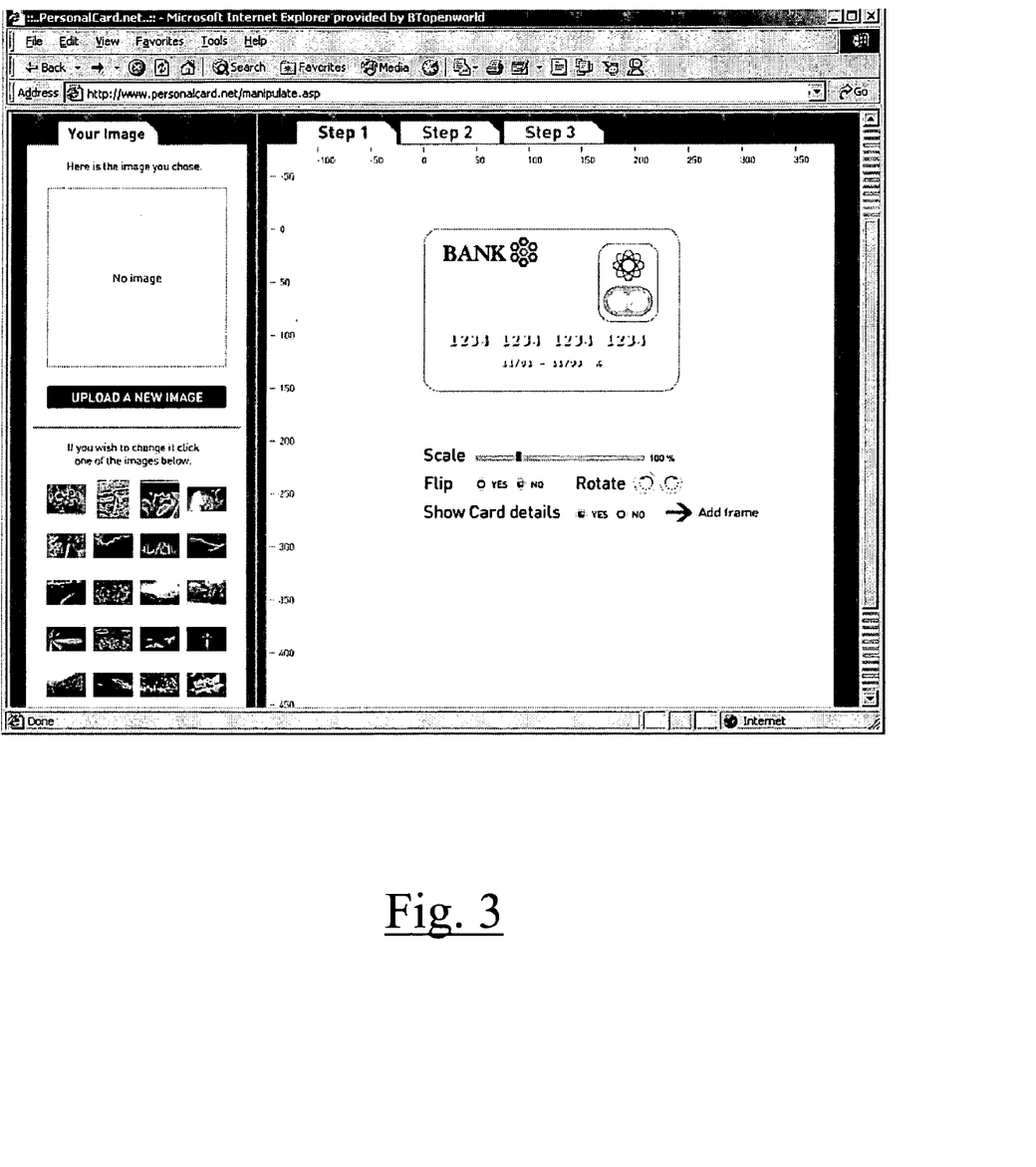
FIGS. 3-10 show screens of a credit card design website, operated in accordance with an embodiment of the invention.
Figure 4:
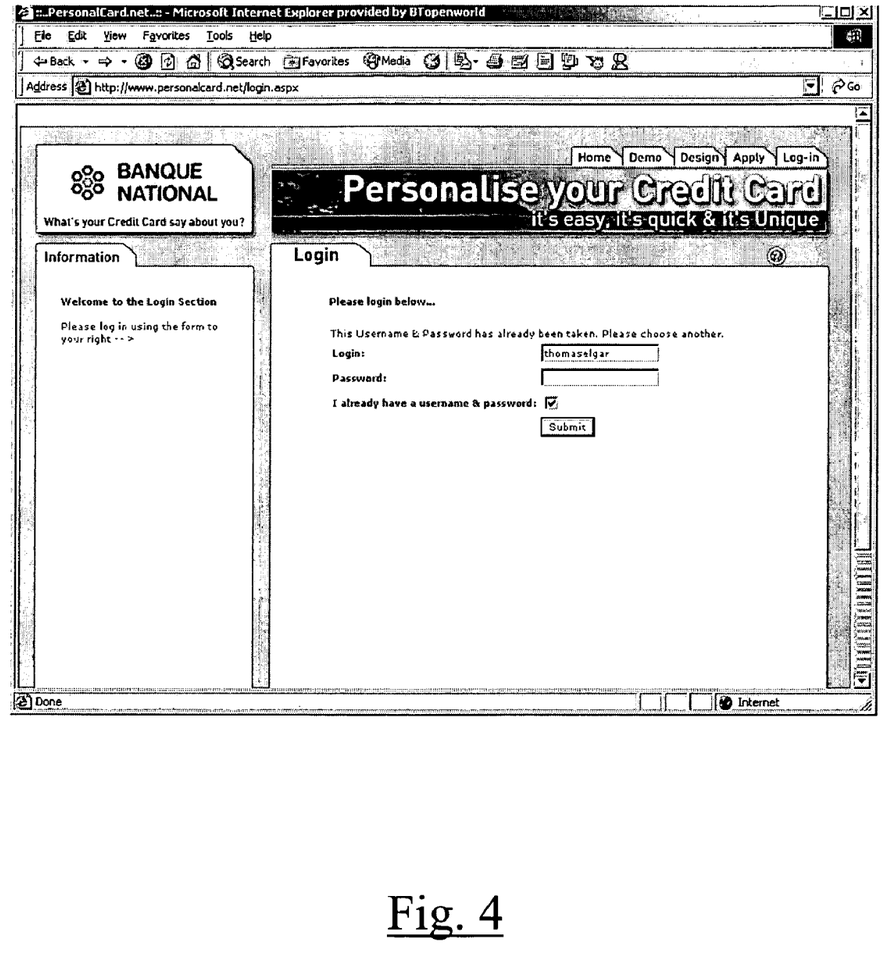
Figure 5:
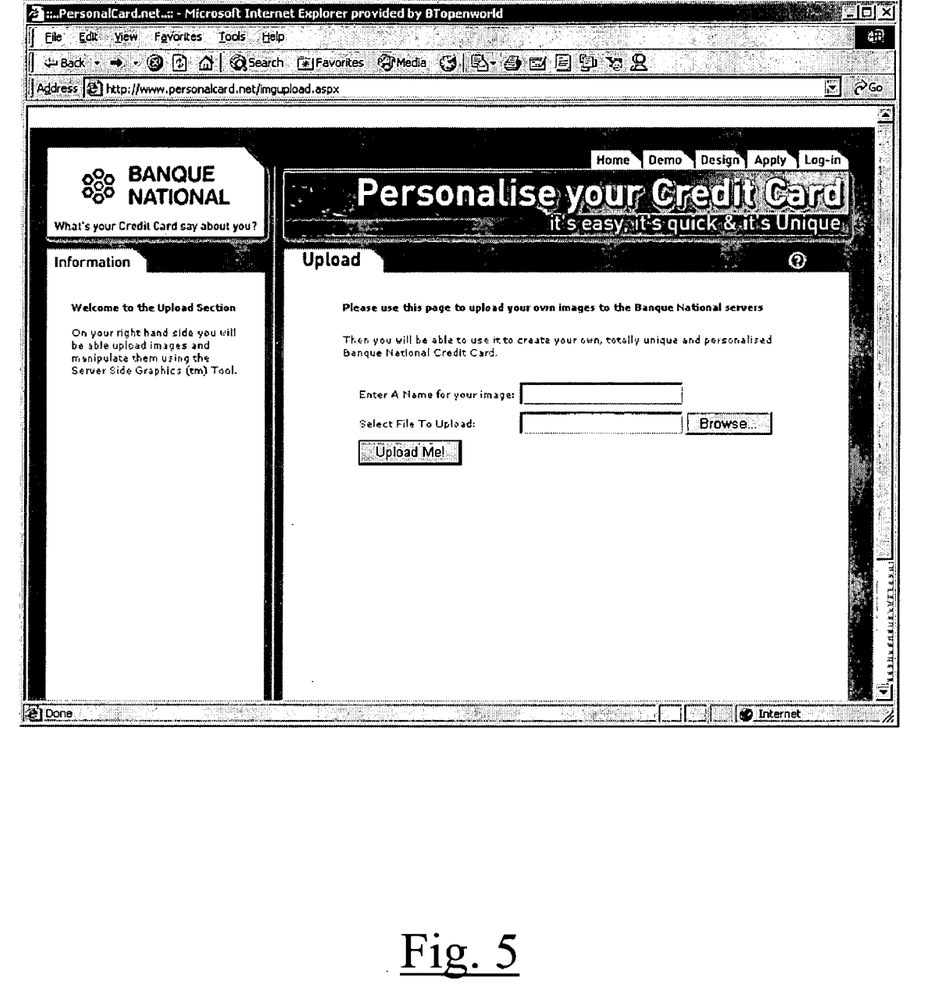
Figure 6:
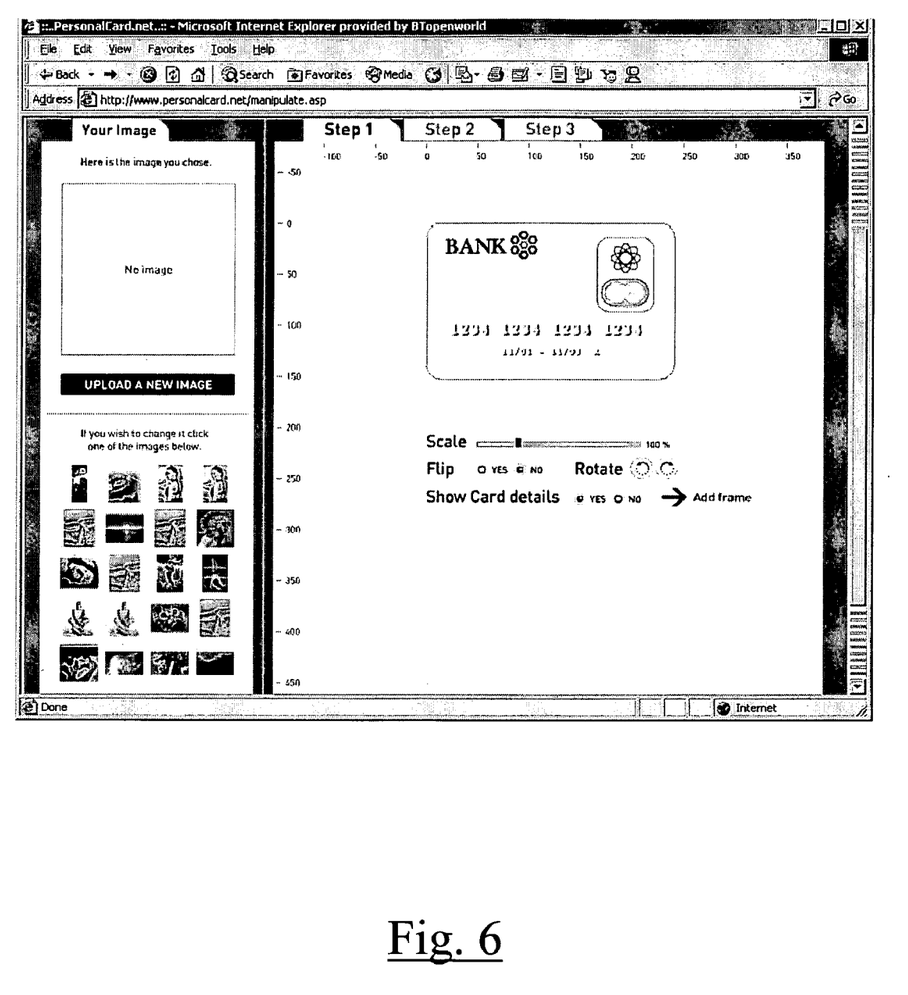
Figure 7:
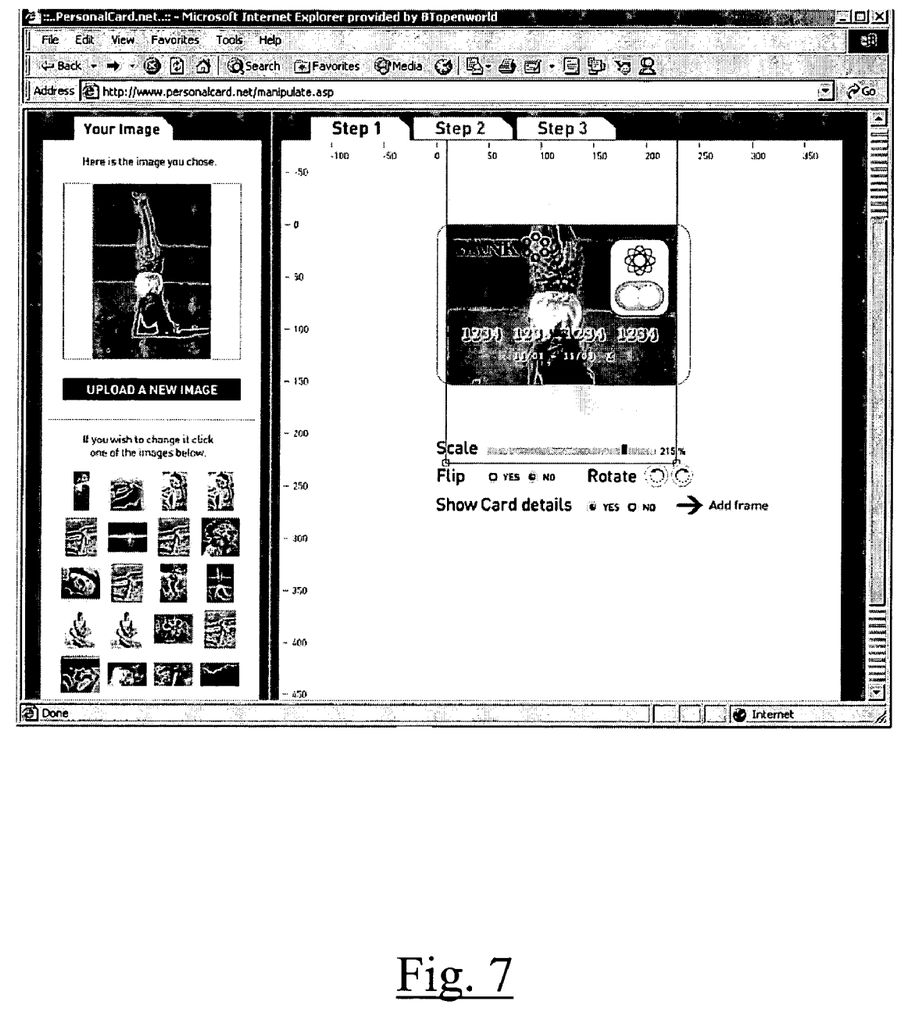
Figure 8:
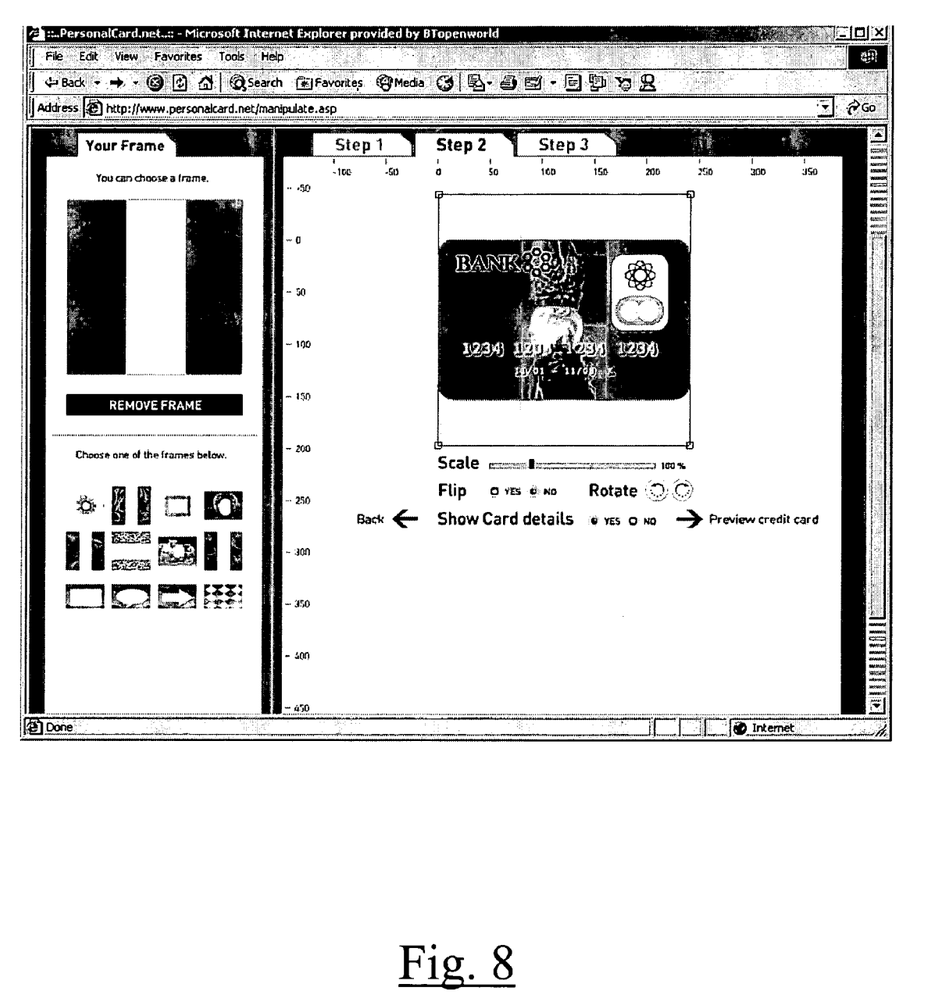
Figure 9:
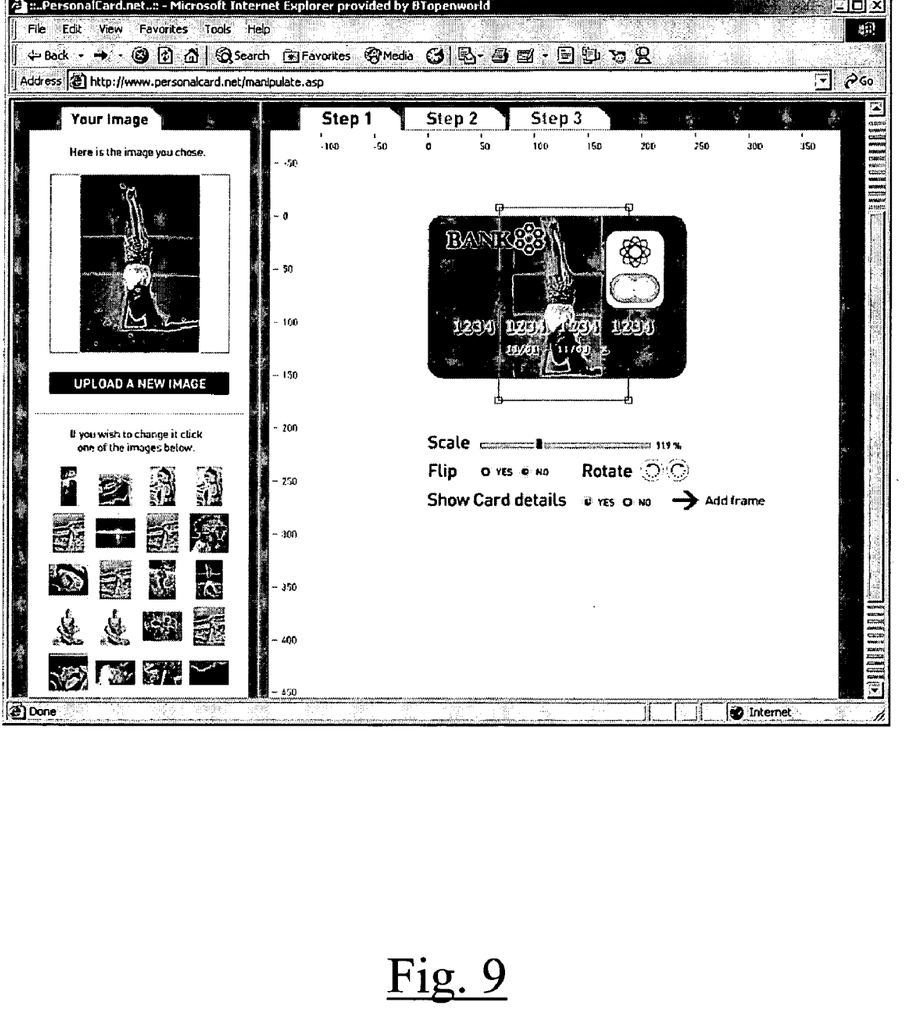
Figure 10:
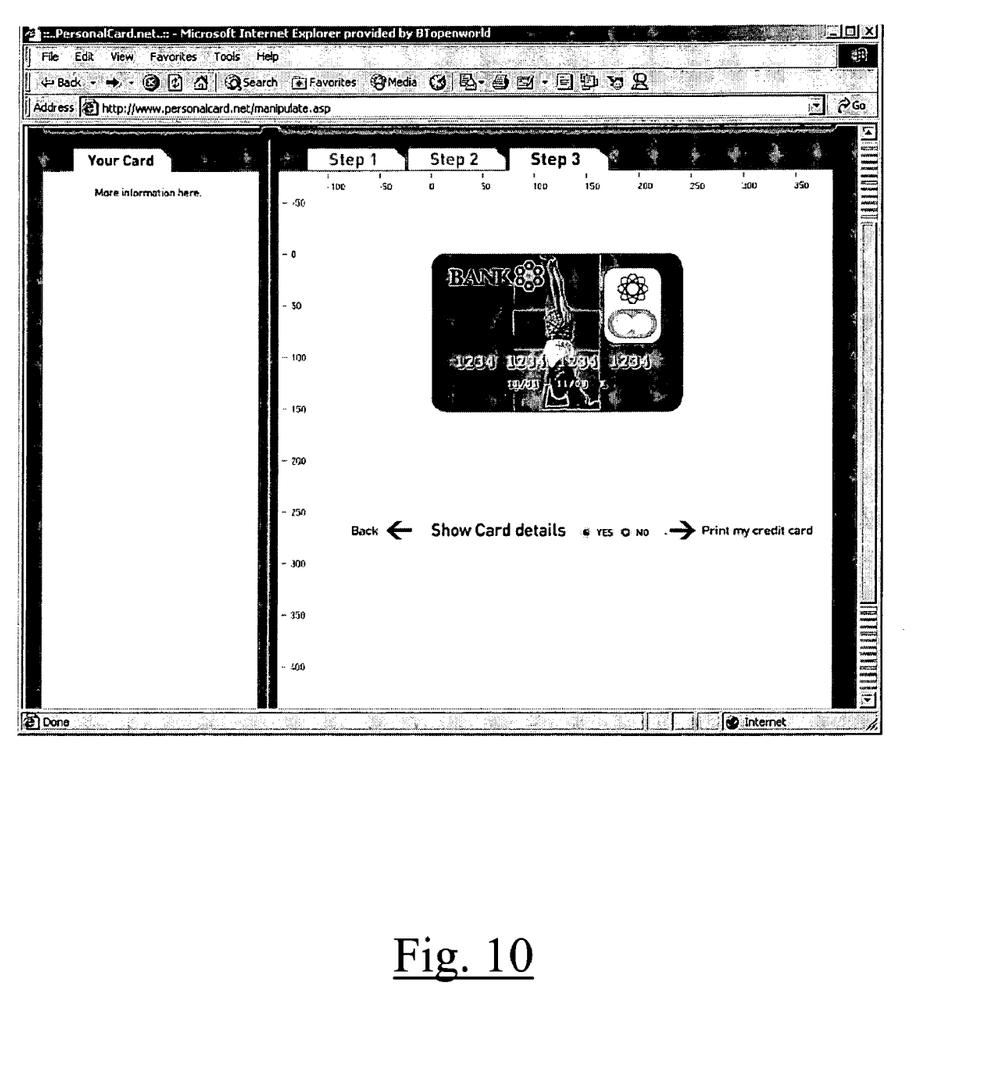

FIGS. 3-10 show screens of a credit card design website operated in accordance with an embodiment of the invention. FIG. 3 shows a first screen, with a standard library of images assigned to the particular bank that is using the credit card design website, on the left of the screen. FIG. 4 shows a screen allowing users to log in so that they can load new images in to the left hand side library. This can be automated in live versions. In FIG. 5, the upload allows the user to browse his or her own computer for images to upload. FIG. 6 shows a screen with a new library including both the user's images and a set of stock images. In the screen of FIG. 7, by clicking on the thumbnail image on the left hand side, the bigger but still web-optimized image is loaded. At this point it can be scaled, flipped, rotated and the card details can be viewed or hidden. In the screen of FIG. 8, frames can then be added. These are Flash (.swf) files that allow transparencies. Again they can be flipped, scaled, rotated and the card details can be hidden. In the screen of FIG. 9, by clicking on the red Back Button or on the Step 1 tab, the user can return. At this point the image is shown as "live" but the frame can be seen as well. The screen of FIG. 10 shows the final version of the credit card before it is sent off to the back end software to be created.

While the foregoing has described what is considered to be the best mode and, where appropriate, other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of modifications without departing from the inventive concepts.

What is claimed is:

1. A computer system for the manipulation of images for application to personalized financial transaction cards, the computer system comprising:
    an image store;
    an image processor;
    means for generating a browser-based user interface for displaying on a remote terminal, for manipulation on the remote terminal a graphical representation of at least a portion of an original image held at the image store, said browser-based user interface being capable of effecting a plurality of manipulations to the graphical representation;
    an image resizer arranged to generate a graphical representation of said original image, wherein said graphical representation comprises a resized version of the original image such that the graphical representation is displayable at said remote terminal for manipulation at said remote terminal;
    an internet communications link arranged to couple the browser-based user interface to the image processor, wherein a user at said remote terminal can use said browser-based user interface to upload an original image such that it is transferred via said internet communications link to said image store, and wherein the link is operable to receive information about said manipulations applied to the graphical representation and transfer said information between the browser-based user interface and the image processor; and said image processor is operable to access the original image held at the image store to apply manipulations emulating those applied to the graphical representation at the remote terminal; and
    means for communicating a version of the original image comprising the applied manipulations to a financial transaction cards printing means maintained securely from the browser-based user interface;
    wherein the only customer information which passes from the remote terminal to the image processor is data about how the graphical representation appears, including manipulations and selections, and requests for image information.

2. A computer system according to claim 1, wherein the image held at the remote image store is of a relatively higher resolution than the graphical representation of at least a portion of the image.

3. A system according to claim 1, further comprising:
    a front end server for presenting the user interface; and
    a back end server, comprising the image processor, for communicating with the front end server and with the image store.

4. A system according to claim 3, wherein the front end server further comprises means for communicating a user manipulation data string to the back end server.

5. A system according to claim 1, wherein the user manipulations comprise operations selected from rotating, re-sizing, and positioning the original image.

6. A system according to claim 1, wherein the user manipulation data further comprises data relating to at least one image for overlaying onto the original image.

7. A system according to claim 6, wherein the at least one image for overlaying comprises a transparent frame image.

8. A system according to claim 1, further comprising means for associating a unique identifier with the user applying the manipulations to the graphical representation, wherein the internet communications link is operable to transfer the unique identifier between the user interface and the remote image processor.

9. A system according to claim 1, wherein the browser-based user interface is operable such that a user can define an image desired for output as one or several representative components, each of which has its position defined relative to an origin and can be manipulated based on a set of predetermined rules.

10. A system according to claim 1, wherein the browser-based user interface comprises front end software operable entirely within an internet browser.

11. A method of operating a computer system for manipulation of images to be applied to personalized financial transaction cards, the method comprising:
    providing an internet communications link coupling a browser-based user interface operable at a remote terminal to an image processor of the computer system;
    receiving an original image uploaded by a user at the browser-based user interface of the remote terminal and transferring said image to an image store of the computer system via said internet communications link;
    generating a graphical representation of at least a portion of said original image, said graphical representation comprising a resized version of the original image;
    displaying said graphical representation of at least a portion of said original image, said graphical representation comprising a resized version of the original image;
    transferring information about manipulations applied at the remote terminal to the graphical representation at the remote terminal between the browser-based user interface and the remote image processor via said communications link; and
    causing the image processor to access the image store and apply, to at least a portion of the original image held in the image store, manipulations emulating those applied at the remote terminal to the graphical representation at the remote terminal; and
    causing the image processor to communicate a version of the original image comprising the applied manipulations to a financial transaction cards printing means maintained securely from the browser-based user interface;
    wherein the only customer information which passes from the remote terminal to the image processor is data about how the graphical representation appears, including manipulations and selections, and requests for image information.

12. A system according to claim 11, further comprising transferring a unique identifier between the user interface and the image processor, the unique identifier being associated with the user applying the manipulations to the graphical representation.

13. A system according to claim 11, further comprising printing an image, produced by applying the manipulations that emulate those applied to the graphical representation, onto a transaction card.

14. A non-transitory computer-readable medium for the personalization of an image to be applied to a financial transaction card, the computer-readable medium comprising computer-readable instructions that, when executed by a processor system, cause the processor system to perform the following:
  provide an internet communications link coupling a user interface of a remote terminal to an image processor of the computer system;
  receive an original image uploaded by a user at the remote terminal and transferring said image to an image store of the computer system via said internet communications link;
  generate a graphical representation of at least a portion of said image, said graphical representation comprising a resized version of the original image;
  display said graphical representation at a browser-based interface for manipulation at said a browser-based interface, wherein said browser-based interface is operable to allow a user to effect a plurality of manipulations to said graphical representation;
  transfer information about manipulations applied to the graphical representation at the remote terminal between the browser-based user interface and the remote image processor via said internet communications link; and
  cause the image processor to access the image store and apply, to at least a portion of the original image held in the image store, manipulations emulating those applied to the graphical representation at the remote terminal; and
  cause the image processor to communicate a version of the original image comprising the applied manipulations to a financial cards printing means maintained securely from the browser-based user interface;
  wherein the only customer information which passes from the remote terminal to the image processor is data about how the graphical representation appears, including manipulations and selections, and requests for image information.

* * * * *